United States Patent
Bakhmach

(10) Patent No.: US 12,373,281 B2
(45) Date of Patent: Jul. 29, 2025

(54) DATA PROCESSING PROCEDURE FOR SAFETY INSTRUMENTATION AND CONTROL (I AND C) SYSTEMS, I AND C SYSTEM PLATFORM, AND DESIGN PROCEDURE FOR I AND C SYSTEM COMPUTING FACILITIES

(71) Applicant: Ievgenii Bakhmach, Kyiv (UA)

(72) Inventor: Ievgenii Bakhmach, Kyiv (UA)

(*) Notice: Subject to any disclaimer, the term of this patent is extended or adjusted under 35 U.S.C. 154(b) by 105 days.

(21) Appl. No.: 18/140,566

(22) Filed: Apr. 27, 2023

(65) Prior Publication Data
US 2023/0281076 A1 Sep. 7, 2023

Related U.S. Application Data

(62) Division of application No. 17/112,927, filed on Dec. 4, 2020, now Pat. No. 11,669,391.

(Continued)

(51) Int. Cl.
*G06F 11/00* (2006.01)
*G06F 11/07* (2006.01)
*G06F 11/30* (2006.01)

(52) U.S. Cl.
CPC ...... *G06F 11/0796* (2013.01); *G06F 11/0736* (2013.01); *G06F 11/0757* (2013.01); *G06F 11/3013* (2013.01); *G06F 11/3058* (2013.01)

(58) Field of Classification Search
CPC ............ G06F 11/0796; G06F 11/0736; G06F 11/0757; G06F 11/3013; G06F 11/3058;
(Continued)

(56) References Cited

U.S. PATENT DOCUMENTS

| | | | |
|---|---|---|---|
| 7,870,299 B1* | 1/2011 | Sorensen | G06F 11/1641 710/2 |
| 2011/0313580 A1* | 12/2011 | Bakhmach | G05B 9/03 700/79 |

(Continued)

FOREIGN PATENT DOCUMENTS

| | | |
|---|---|---|
| WO | 2006/071918 A3 | 7/2006 |
| WO | 2009/147820 A1 | 12/2009 |

OTHER PUBLICATIONS

Sklyar, Vladimir, "Safety-critical Certification of FRGA-based Platform against Requirements of U.S. Nuclear Regulatory Commision (NRC): Industrial Case Study", ICTERI 2016, Kyiv Ukraine, Jun. 21-24, 2016, pp. 129-136 (Year: 2016).*

*Primary Examiner* — Joseph D Manoskey
(74) *Attorney, Agent, or Firm* — Steven M. War, Esq.; War IP Law PLLC

(57) ABSTRACT

A data processing method for safe Instrumentation and Control Systems (I&C Systems) based on data processing in safety I&C Systems consisting of self-diagnosable modules of the platform with the unified architecture, to use specifically developed computing facilities implemented in FPGA, to design and configure the modules with the unified architecture of the unified units, to use units operation in different clock domains and diversity technologies, to design and configure the computing facilities, to provide mutual diagnostics and self-diagnostics for hardware, computing facilities, interfaces and data transfer at both modular and system levels implemented by hardware design tools and module platform logic, to use different software for application diverse logic design, to provide I&C System functional safety, to simplify design of modules and I&C Systems, to provide unified process and diagnostics and self-diagnostics coverage, to simplify user operation, to simplify I&C System maintenance and support.

4 Claims, 7 Drawing Sheets

Related U.S. Application Data

(60) Provisional application No. 62/945,837, filed on Dec. 9, 2019.

(58) Field of Classification Search
CPC ............. G06F 11/0703; G06F 11/3041; G06F 11/3051; G06F 11/1608; G06F 11/1629; G05B 19/0428; G05B 2219/24015; G05B 2219/34024
See application file for complete search history.

(56) References Cited

U.S. PATENT DOCUMENTS

| | | | |
|---|---|---|---|
| 2015/0169424 A1* | 6/2015 | Vaananen | G06F 11/3495 714/36 |
| 2015/0331400 A1 | 11/2015 | Birgel et al. | |
| 2017/0293703 A1* | 10/2017 | Titley | G06F 30/34 |
| 2018/0365097 A1* | 12/2018 | Cornes | G06F 11/0772 |
| 2023/0036117 A1* | 2/2023 | Krishnani | G06F 11/0757 |

* cited by examiner

DATA PROCESSING PROCEDURE FOR SAFETY INSTRUMENTATION AND CONTROL (I AND C) SYSTEMS, I AND C SYSTEM PLATFORM, AND DESIGN PROCEDURE FOR I AND C SYSTEM COMPUTING FACILITIES

CROSS REFERENCE TO RELATED APPLICATION

This application is a divisional of U.S. patent application Ser. No. 17/112,927, filed Dec. 4, 2020, which claims the benefit of U.S. provisional patent application Ser. No. 62/945,837, filed Dec. 9, 2019, the entire content of which is incorporated herein by reference.

FIELD OF THE INVENTION

The invention relates to the field of automatic devices, particularly to digital equipment for process monitoring and control systems, and is intended for application in different industrial fields: in critical safety systems of hazardous productions and normal operating systems of industrial companies.

BACKGROUND OF THE INVENTION

It is known Digital Process Type Monitor Device, application WO 2009/147820, MPK G06F11/34. Digital Process Type Monitor Device includes a set of modules and backplane connected to each module. Each module includes a base board having a field-programmable gate array ("FPGA") for main control and a FPGA for sub-board, and a sub-board for a human-machine interface processing having an installed FPGA for interface ("I/F") processing, storage devices for storing human-machine interface information on the sub-board or base board. Each of the FPGAs writes transmission data into a predetermined region of a transmission area and has a common transmission protocol to share the transmission data between the respective modules. The modules may contain a board for input/output ("110") processing with FPGA for I/O processing and I/O element mounted thereon. The main control FPGA of the module base board performs peripheral input-output. The modules can contain diagnostic sub-board to identify the state of the base board and data inside of a transmission area, and the state of I/O sub-board and other modules on the basis of the state of the board and information inside of the region of a transmission area providing diagnostics of each board inside the module.

The disadvantages of this invention are generally as follows:
  modules consist of a plurality of universal boards each performing its functions. When any board is broken the whole board needs replacement, therefore many spare boards are needed resulting in substantial expenses and additional time for board restoration
  diagnostics of all devices is performed on the basis of the main board state and information inside the region of a transmission area not providing enough control, required diagnostic depth, determined diagnostic time.

In addition, use of separate board for diagnostics leads to additional expenses.

It is known Architecture for a Control System, application WO 2006/071918, MPK G05B 15/00, comprising a plurality of control devices, each includes a set of software objects, a software application program, a system application program, an execution engine for running said application program whereby a common interface is provided to internal functions within control devices across all devices in said system.

The software objects implement different types of internal functions for control devices, and standard functions common for all similar program devices. The program includes standardized application instructions displaying numeration and function calls within the system from said software objects with the functions used and thereby defining the operation of the control devices in application programs.

The disadvantages of this invention are generally as follows:
  usage of program devices each performing only its functions, and software designed for each program device which maintenance and control are complex and expensive;
  complexity of file verification before downloading to FPGA;
  high probability of interruptions;
  not enough control is provided, diagnostic depth is needed, time of diagnostic is determined.

It is known A System and Method for Use in Automation Technology, application US 2015331400, comprising:
  at least one field device equipped with a basic firmware; a superordinated unit; operating program for servicing; a bus, via which said superordinated unit communicates with the at least one field device. A central unit, wherein:
  a plurality of specific application firmwares configured in accordance with the specific features of technological process.
A central unit provides specific application firmware to the field device.

The disadvantages of this invention are generally as follows:
  usage of field devices and subordinated units each designed for performance of only its designated functions, requires manufacturing of many different units and field devices that have low processability level that complicates verification and licensing process, does not provide functional safety of the devices and operation of the devices in the rapid mode, respectively complicates system design and leads to severe losses;
  configuration of a plurality of special application firmware for the field devices does not allow to minimize the risk of common cause failures, does not provide resistance to any virus, is modifiable, requires big spending for development of a plurality of special application firmware.

All of these things do not provide enough failure tolerance as well as integrity, functional safety and high reliability of I&C System.

The group of these inventions is based on the modular design principle, safety and diversity concepts providing high-level functional safety and reliability of I&C System, universal and simple design of the modules and said system, complete diagnostics and self-diagnostics coverage, minimized risk of common-cause failures.

SUMMARY OF THE INVENTION

An object of this invention is to provide data processing method for safe Instrumentation and Control Systems (I&C Systems) based on data processing in safety I&C Systems consisting of self-diagnosable modules of the platform with the unified architecture, to use specifically developed computing facilities implemented in FPGA, to design and configure the modules with the unified architecture of the unified units, to use units operation in different clock domains and diversity technologies, to design and configure the computing facilities, to provide mutual diagnostics and self-diagnostics for hardware, computing facilities, interfaces and data transfer at both modular and system levels implemented by hardware design tools and module platform logic, to use different software for application diverse logic design, to provide I&C System functional safety, to simplify the design of modules and I&C Systems, to provide unified process and diagnostics and self-diagnostics coverage, to simplify user operation, to simplify I&C System maintenance and support.

It is another object of the present invention to develop the platform based on the configurable hardware with the hardware tools and computing facilities intended for the development of safety I&C Systems, by the way of designing self-diagnosable modules with the unified FPGA-based architecture of the unified units, to use the units in different clock domains and diversity technologies for modules design, to provide self-diagnostics and mutual diagnostics, to use the connections with a proprietary protocol, to provide individual protection features, to simplify module and I&C System design, to provide their maximum processability and adaptability for verification, certification, licensing, to provide rapid operation mode of the modules.

It is still another object to provide a method for computing facilities development for the safety Instrumentation and Control Systems consisting of the platform modules, by implementation of the method in FPGA of each module as finite-state automation with strictly determined run time based on platform logic and application logic, design of RadICS Platform Configuration Toolset ("RPCT") for development and automatic verification of platform-based I&C System, to ensure resistance to any virus, to minimize risks of common-cause failure within a platform, to prevent FPGA projects from re-compilation by an external user.

The objective is achieved in such a way that in data processing method for safety I&C Systems that includes input data processing and output data generation, according to the invention the input data are received by the platform modules that configure into I&C functionally oriented architecture by setting the computing facilities with RPCT as application logic, the input data are processed in the platform modules using computing facilities that are described and implemented in FPGA of each module as embedded platform logic and application logic as finite-state automation with strictly determined run time that is performed by the embedded logic using logic module FPGA so that watchdog timer operates in CLK A unit, diagnostic logic operates in CLK B unit, application (control) logic operates in CLK C unit of clock generator of each module, watchdog timer operation is implemented on diverse technology in relation to application logic and diagnostic logic, herewith diagnostic and self-diagnostic is performed for platform logic, hardware, interfaces and data transfer facilities with errors detection at both modular and system levels as well as error selection by critical level:

Errors of I and II type that take system to the safe state, particularly:
errors of critical type (type I) that are detected by the watchdog timer facilities when the platform logic cannot guarantee transition to the safe state;
errors of critical type (type II) when hardware or platform logic part cannot perform its functions correctly;
and errors (type III) which criticality and processing algorithm are identified by the user and performed by the application logic.

The method provides development of both safe simple one-channel Instrumentation and Control Systems and the systems resistant to common-cause failures by the way of interconnection of the diverse channels using optic communication in two, three and four channel systems using "1oo2" selection rules with actuation priority and majority voting of the signals under "2oo3" and "2oo4" principles. Platform logic self-diagnostics is performed using said platform logic. Hardware diagnostics is performed by hardware design of the units or by their assembly within the module. There are two logic modules in configuration—the logic modules perform diagnostics of the state of each other. Self-diagnostics of the units is performed using platform logic of each module and the module using such units. Mutual diagnostics of hardware is performed using combination of the clock generator units in the result of exchange of data and signals between different clock domains. Self-diagnostics of the interfaces and data transfer facilities is performed using platform logic. FPGA operation diagnostics is performed using watchdog timer. Diagnostics is performed on the platform level that is configured by the platform manufacturer, and on the application logic level that is configured by the user or platform manufacturer. Application logic diversity is provided by:
usage of RPCT facilities and/or software of FPGA manufacturer and/or other software;
usage of different means for design and verification;
implementation of different design principles, finite-state automation etc.

In platform for design of safety Instrumentation and Control System containing interconnected input module, output module, optic communication module, logic module where each module contains at least one FPGA unit, one indication unit, one power supply unit and watchdog timer unit, one communication unit, one unit of non-volatile EEPROM memory, clock generator device, verification and diagnostic facilities, according to the invention, FPGA unit of each module is designed with an option of computing facilities as finite-state automation with strictly determined run time and embedded platform logic where environment for application logic is designed, logic module FPGA unit design provides development, verification and downloading of application logic using RPCT, clock generator device contains units of CLK A clock generator to generate clock cycles of the watchdog clock cycles, CLK B for generation of diagnostic logic clock cycles, CLK C for generation of application (control) diagnostic logic clock cycles performed in different clock domains, watchdog timer is designed on the diverse technology in relation to hardware of application logic and diagnostic logic, verification and diagnostic facilities design provides self-diagnostics and mutual diagnostics of hardware, computing facilities, interfaces and data transfer facilities in real time which functionality is based on operation of the units in different clock domains and usage of diverse technologies for design of these units, modules for data exchange are interconnected using communication channels of point-to-point type with the proprietary exchange protocol, the platform consists of the individual facilities protecting from overcurrent and overvoltage for each module designed as a separate board. The platform design provides a few additional input modules, output modules, optic communication modules, logic modules. Each of the modules via common backplane is connected to the logic module. The platform logic module additionally includes at least one of the following elements: addressing unit, SSRAM memory unit, real time unit, input unit, output unit, external communication unit, Safety Override unit. Optic communication module additionally includes at least one unit of external communications. Input module additionally includes at least one input unit. Output module additionally includes at least one of the following elements: output unit, Safety Override unit. The platform includes independent temperature regulation facilities—at least one fan module with independent operation conditions and power supply circuit. In platform configuration with two logic modules, the logic modules are interconnected by at least two full-duplex LVDS communication lines. In configuration with two logic modules one of the logic modules operates in hot stand-by. The modules are connected with each logic module by means of at least one dedicated full-duplex communication line of LVDS type.

In method of creation of the calculation device for safety Instrumentation and Control Systems, made of the platform modules according to the invention the calculation device is described and implemented in FPGA of each module as finite-state automation with strictly determined run time where the platform logic is developed for performance of control and diagnostic I&C System functions and application logic is developed for performance of the functions identified by the user for each application in such a way that RPCT is designed for development and automation-based verification of platform-based I&C System, in FPGA of each module the platform logic is developed and described with the environment for application logic performance, application logic is developed (designed) as finite-state automation, and said logic is verified and downloaded to the logic module by RPCT that is performed by the platform logic, the designed Function Block Library is the same for all systems, herewith the application logic is described as a set of calls of function blocks from the library. The platform logic and Function Block Library is designed and downloaded to the non-volatile memory at the manufacturing stage by the manufacturer that are not allowed for modification. Application logic (user algorithm) is developed by the user or platform manufacturer at the stage of design engineering. Application logic algorithms are modified during installation using special load facilities. The application logic is stored in the external non-volatile memory and/or in FPGA of logic module. In the method the application logic is provided with an option of signal parameters change within prescribed limits as well as change of signal conditioning time delay element settings via engineering station using an access right. The method provides application logic configuration from the content of Function Block Library using RPCT and/or software of FPGA manufacturer. The method provides settings configuration (scale, signal level, modifications, damping time, delay time for clangor elimination etc.) for input/output modules via engineering station using an access right. The method for computing facilities provides adaptation and transfer (porting) to the new devices regardless the hardware model (family etc.).

The group of inventions proposed has new distinctive features providing new technical characteristics. The technical result is maximum manufacturability of the modules, unified and simple design of the modules and I&C System, unified diagnostics and self-diagnostics, control coverage and required diagnostics depth, failure tolerance, integrity, functional safety and high I&C System reliability, increased speedwork, simplified work for user.

The group of inventions "Data processing procedure for safety Instrumentation and Control Systems (I&C System), I&C System Platform and design procedure for I&C System computing facilities" is based on the following:

modular design principle that includes hardware, platform logic, application logic, provides maximally unified modules structure with self-verified diagnostics, simple design of the modules and I&C Systems and capability to design new platform modules according to said principle;

safety concept provides the modules design based on the unified architecture, provides their maximum processability (convenience of design and setting), adaptability to verification and licensing because of duplicated components and devices, usage of different software as a development environment in one hardware (RPCT, software of FPGA manufacturer or other software), usage of diverse technologies to increase I&C System reliability, the variety of choices for user;

diversity support provides different software options for one hardware (RPCT, software of FPGA manufacturer, etc.) to develop diverse application logic, minimizes risks of common-cause failure within a platform.

Integrity, high functional safety and system reliability are provided by configuration of the specified I&C System from the self-diagnosable modules with the unified FPGA-based architecture and usage of specially designed computing facilities as a finite-state automation with the strictly determined run time implemented in FPGA of each module.

Design of computing facilities in FPGA of each module as a finite-state automation with the strictly determined run time (without interruptions) and embedded platform logic, that are divided into independent parts—platform logic and application logic, does not allow external users to recompile FPGA projects, provides resistance to any virus, minimized risks of common-cause failures within one platform, I&C System functioning without interruptions and software.

RPCT provides design and automatic verification of platform-based I&C System, configuration of computing facilities, application logic development, verification of the application logic and its downloading to the platform logic module only by RPCT command.

A user develops the necessary system comprising of the platform modules provided by configuration of I&C System as functionally-oriented architecture consisting of self-diagnosable modules by the way of setting the computing facilities with application logic using RPCT that is performed by the embedded platform logic using logic module FPGA and which performs the functions identified by the user for each application in the specified I&C System.

Design of application logic, diagnostic logic and watchdog timer operation in different clock domains (clock generator units: CLK A, CLK C, CLK B) of each specified module, provides separation of control and monitoring functions from diagnostic functions that makes them independent from each other.

Design of watchdog timer based on the diverse technology (complex programmable logic device CPLD) in relation to hardware of application logic and diagnostic logic minimizes common-cause failures within the module and system in general.

Usage of independent verification facilities and hardware diagnostics, computing facilities, interfaces and data transfer facilities designed with the functions of self-diagnostics and mutual diagnostics of these facilities in real time (within system operation cycle) based on units operation in different clock domains and usage of diverse technologies in design of these units to provide mutual diagnostic function, provides complete control and required diagnostic depth in strictly determined run time, makes decision making more flexible.

The required level of failure detection (99.9%), I&C System diagnostic design flexibility are provided by performance of diagnostics on the platform level configured by the platform manufacturer and at the application logic configured by the user, if necessary.

User operation is simplified by module configuration in the unified FPGA-based architecture made of one-type units with self-checking diagnostic facilities provides maximum unification and simplification of module structure that provides maximum processability, convenient development and adjustment, adaptability to verification and licensing because of duplicated components and devices.

Platform modules have the high level of determinism: the whole operation cycle is divided into the phases (input information processing, program performance, output information generation, waiting etc.), control of time for each phase is implemented.

Module design provides flexible configuration of redundant system structures by means of adding required level and type of redundancy.

Usage of proprietary protocol of data exchange between the modules provides multi-level protection of message integrity from damages and external attacks.

Usage of individual facilities protecting from overcurrent and overvoltage for each module designed as a separate board, provides simplified platform module maintenance by replacement of the board, if needed, without interference in the module.

In the platform usage of two logic modules ("LM") that operate on hot standby and connected between each other with at least two full-duplex communication lines of LVDS type and performs diagnostics of each other, increases I&C System reliability—in case of failure of any LM the operation will be continued by the other one.

Fan module design as the separate boards significantly simplifies platform-based system maintenance, because in case of fan module failure the one may be replaced quickly.

Computing facilities design in FPGA and their separation into platform logic and application logic disables I&C System remote control and replacement of computing facilities precluding security attacks by any viruses on the process equipment.

The high security level of designed I&C Systems is provided by platform logic developed by the platform manufacturer that includes only self-designed computing facilities and is downloaded to the non-volatile memory at the manufacturing stage and is not allowed for modification. Platform logic is easily portable to the new devices regardless of their model/family and other hardware.

Application logic is designed for each application by the user or platform manufacturer at the stage of design engineering herewith application logic algorithm modification is impossible without interruption of system operation in digital networks and it is performed only at installation stage using special load facilities providing absolute resistance to the viruses of any type.

Usage of RPCT and/or software of FPGA manufacturer and/or other software as well as different design and verification methods and different performance principles, provides diverse application logic.

Online control of data integrity and protection from unauthorized intervention is provided by the measures that include control of monotony, Cyclic Redundancy Check CRC, ID identifier check, frame numbering control etc.

Modular principle in I&C System design, algorithm implementation in FPGA and usage of computing facilities as finite-state automation with strictly determined run time and embedded platform logic divided into the independent parts, provide I&C System design of different types, assembly, level and type of redundancy, and simple platform-based I&C System design process.

DETAILED DESCRIPTION

Figure 1:
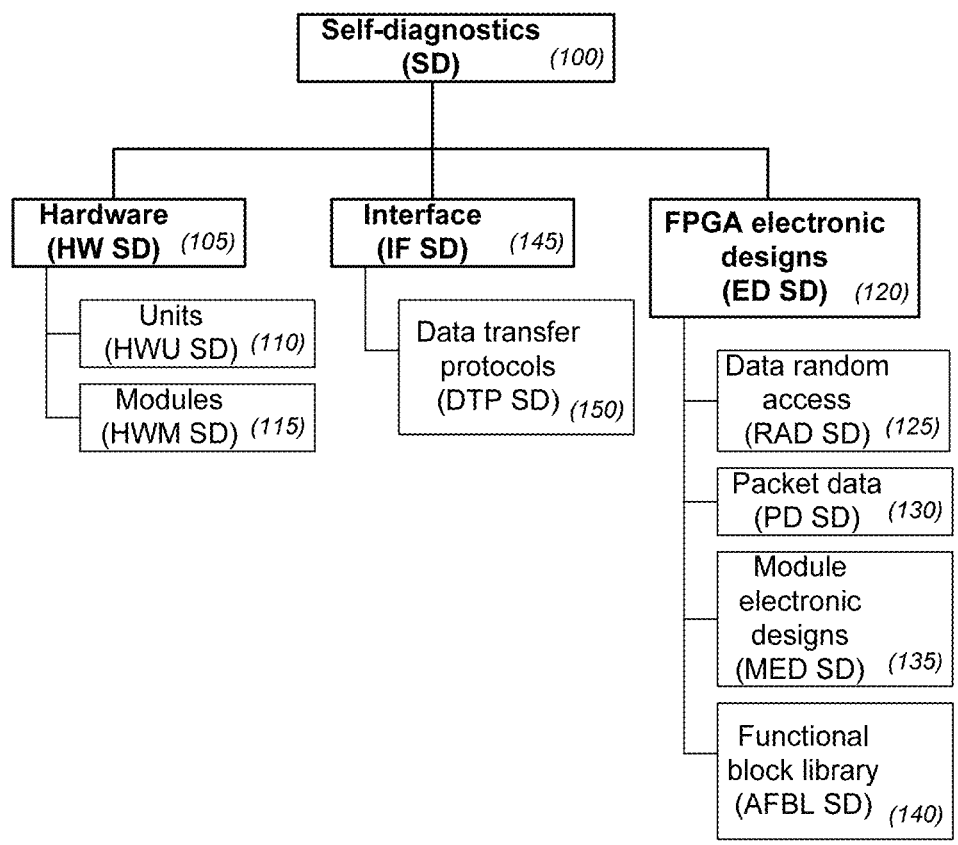
FIG. 1 shows a classification of self-diagnostics techniques.

Data processing method for safety Instrumentation and Control Systems, platform for I&C System design and design procedure for I&C System computing facilities are performed in the following way.

Platform modules are configured in functionally-oriented architecture of I&C System by setting computing facilities using RPCT as application logic.

Platform modules have unified architecture and implement different types of functions for the specified I&C Systems. Module operation is based on the operation of the units in different clock domains and the usage of diverse technologies in the design of these units. In FPGA of each module the computing facilities are described and implemented as finite-state automation with the strictly determined run time and embedded platform logic. Computing facilities have platform logic for the performance of different types of functions for I&C System in the specified modules and application logic for the performance of the functions identified by the user for each application in the specified I&C System.

RPCT is designed for the development and automatic verification of platform-based I&C System.

Platform logic is formed and described in FPGA of each module where the environment for application logic is designed. Application logic is developed as a finite-state automation, and it is verified and downloaded to the logic module by RPCT that performs platform logic. Function Block Library is designed the same for all systems and application logic is described as a set of calls of function blocks from the library. Application logic, diagnostic logic and watchdog timer operation are performed in different clock domains of each specified module, watchdog timer operation is implemented on the diverse technology in relation to the hardware of application logic and diagnostic logic.

The modules contain verification and diagnostic facilities that are performed with an option of self-diagnostics and mutual diagnostics of hardware, computing facilities, interfaces, and data transfer facilities in real-time with functionality based on the operation of the units in different clock domains and usage of diverse technologies for implementing these units.

Diagnostics and self-diagnostics of platform logic, hardware, interfaces, and data transfer facilities are performed with detection of the errors at the module and system level as well as error selection by criticality level:

Errors of type I and II that actuate safe state of the system, particularly:

errors of critical type (type I) that are detected by the watchdog timer facilities when the platform logic cannot guarantee transition to the safe state;

errors of critical type (type II) when hardware or platform logic part cannot perform its functions correctly;

and errors (type III) which criticality and processing algorithm are identified by the user and performed by the application logic.

Approaches to ensure integrity and function safety that are used in the platform are divided into three basic groups:
1) Hardware Self-Diagnostics HW SD;
2) Interface Self-Diagnostics IF SD;
3) Electronic Design Self-Diagnostics ED SD.

And they are integrated with each other.

Hardware Self-Diagnostics HW SD.

The errors detected by self-diagnostics are divided into three types (type I, II and III) at the modular and system levels.

At the modular level:
a) errors detected by watchdog timer facilities (type I)—platform control logic cannot guarantee transition to the safe state, and watchdog timer must stop voltage supply (for example, when FPGA error is detected)
b) errors of critical level (type II)—Hardware or Electronic Design ED part cannot correctly perform the functions but other platform part that controls the outputs related to safety can guarantee their automatic transition to safe state (for example, when module receives corrupted data, the safe state will be actuated for the outputs)
c) errors of the level identified by the user (type III)—the user identifies criticality of detected errors and algorithm of their processing (performed by application logic). Platform control logic and application logic guarantee transition to the safe state (for example, input signals overstepping the limits, input signal defect, input module failure, in this case application logic takes decision about failure criticality).

At the system level:

If I/O module has an error of type III, application logic in logic module (LM) makes decisions how to process it (it is responsibility of the end user), but the error of type I and II in logic module (LM) it is interpreted as an error of the product level of type I and the safe state is actuated for all outputs.

If output module detects an error of type II the safe state must be actuated for the module outputs and logic module (LM) must be informed about it; if I/O module detects an error of type I, it must be de-energized and the safe state of platform will be actuated because of lack of communications between the logic module (LM) and this module (type II for LM).

Consequently, there are three ways of platform transition to the safe state. Each of them can perform transition of the outputs.

Self-diagnostics is performed within the time not exceeding 300 ms.

Self-diagnostics informs about failure detection with the speed allowing transition within the time not exceeding 10 ms.

Self-diagnostics method classification 100 is shown in FIG. 1.

Platform hardware interacts with the interfaces, identifies validity and data integrity. Hardware units 105 are covered with the diagnostics implemented by their hardware units (HWU SD) 110, that provides to perform diagnostics of each component functioning and/or their configuration within the module—Hardware Module Self-Diagnostics HWM SD 115.

The configuration consists of two logic modules LM—the logic modules perform mutual diagnostics of the state.

Electronic Design Self-Diagnostics ED SD.

Electronic Design Self-Diagnostics 120 is performed by said platform logic.

Platform logic receives, processes and develops data for platform functioning. It performs the task of diagnostics covering for the interfaces and hardware as well as own components. Therefore, on the basis of diagnostics results the decision is taken to transfer the system in the corresponding state.

Electronic Design Self-Diagnostics ED SD 120 consists of:
Random Access Data Self-Diagnostics RAD SD 125;
Packet Data Self-Diagnostics PD SD 130;
Module Electronic Design Self-Diagnostics MED SD 135;
Application Function Block Library Self-Diagnostics AFBL SD 140.

Electronic design of each module performs self-diagnostics of the units and the modules using such units.

Hardware mutual diagnostics is performed using the combination of the units of Clock Generator CLK in the result of data exchange and signals between different clock domains.

Interface Self-Diagnostics IF SD 145.

Self-diagnostics of the interfaces and data transfer facilities is performed using the platform logic.

Measures to provide IF SD:
Cyclic Redundancy Check CRC ensures check of data integrity
Counter device ensures control of monotony
ID verification provides data transfer protocol identification (including identification of the source and receiver)
Frame numeration control provides control of frame transfer monotony,
Time out provides diagnostics of communication line integrity,
Confirmation provides diagnostics of source and receiver operation
Unique verification of ID for transferred data via optic channels (OCM to OCM, LM to LM and LM to OCM).

Also platform logic provides Data Transfer Protocols Self-Diagnostics DTP SD 150 and check of EEPROM data compatibility.

Watchdog Timer Provides FPGA Operation Diagnostics.

Self-diagnostics of the performed functions is provided by the diagnostic functions of electronic design:

Continuous Cyclic Redundancy Check CRC of FPGA configuration:
As a part of platform logic
As a part of FPGA hardware.

The diagnostics is performed at platform level that is configured by the platform manufacturer, and if required, at the application logic level configured by the user or platform manufacturer.

In the method the application logic diversity is provided by the following:
- computing facilities of RadICS RPCT
- software of FPGA manufacturer and/or other software;
- different facilities for design and verification;
- implementation of different principles of performance, finite-state automation etc.

The method provides usage of different software for the same hardware including for application logic.

The development environment for platform-based I&C System design is home-made RadICS RPCT and/or software of FPGA manufacturer (for example, development environment Quartus (Altera)).

The platform is Safety Controller based on architecture of configurable hardware, which HW and SW and computing facilities are designed for safety Instrumentation & Control Systems to perform different tasks at the nuclear and thermal stations, oil/gas, chemical and other industries. The examples of such systems can be automated process control systems, safety control systems, critical control systems and others applied in the nuclear and thermal stations, chemical industry etc.

From the point of functionality the platform is FPGA-based Safety Controller FSC that differs fundamentally by the logic performed by FPGA instead of microprocessors.

The platform is based on the common operation of the plurality of self-diagnosable modules that have unified FPGA-based architecture and computing facilities in FPGA of each of the modules as finite-state automation with the strictly determined run time and embedded platform logic, on which safety I&C Systems are configured. However, platform-based I&C Systems are able to operate even with the logic module only.

Configurable hardware of the platform can be chassis (and others) containing the required number of inputs, outputs, logic processing intended for design of application logic.

The platform includes a few input modules (Analog Input Module AIM, Discrete Input Module, Analog Input Module for Neutron Flux Measurement AIFM), output modules (Analog Output Module AOM, Discrete Output Module DOM etc.), Optical Communication Modules OCM and Logic Modules LM. Each module via common backplane is connected to logic module. The modules exchange the data among each other using the communication channels of "point-point" type according to proprietary exchange protocol.

Each module is provided with the individual facilities protecting from overcurrent and overvoltage designed as a separate board.

The platform consists of the independent temperature regulation facilities—at least one fan module with independent operation conditions and power supply circuit providing chassis forced cooling.

The following I&C System configurations are provided that comply with SIL3 level:
1) one-channel (hardware redundancy=0);
2) multichannel (hardware redundancy>0).

Platform operation is provided by the common operation of baseline configuration (set) of modules and computing facilities with their normal operation and connected to the source of input signals and output signal consumers.

Baseline configuration means design of one chassis (FIG. 2), however extension with a few chassis is provided (FIG. 3) for design of complex I&C Systems or to provide higher safety level.

Figure 4:
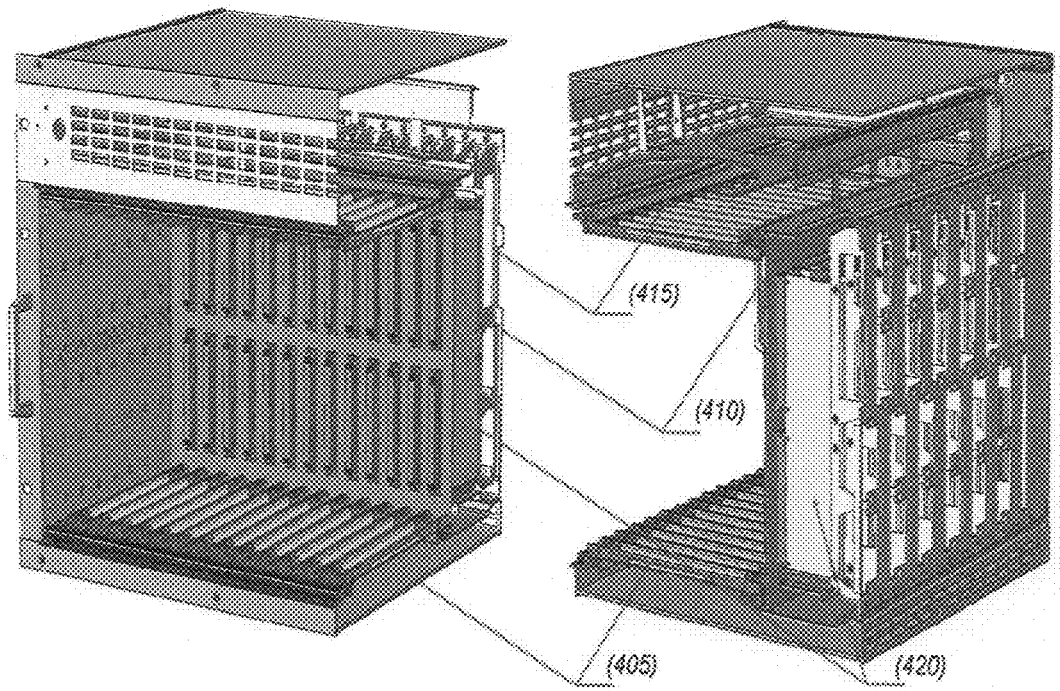
FIG. 4 shows a general view of the chassis.

The general view of chassis is provided in FIG. 4. Chassis design is a metal case 405 consisting of 16 slots for modules, interface connectors 410, slots 415 for fan modules and their control boards, slots 420 for protection modules. Each slot is equipped with the racks for correct and safe module installation. Each module is installed above and below. Each module is connected electrically after module installation into interface connector 410. Platform chassis can include one or two logic modules LM and required number of input modules, output modules, optic communication modules.

Depending on the number of applied logic modules the following configurations are possible:
- with one logic module LM;
- with two logic modules LM.

In configuration with two logic modules the logic modules have the same operation algorithms and provide mutual redundancy within a chassis that is operate in hot stand-by. Logic modules are interconnected with at least two full-duplex communication lines of LVDC type. The modules are connected with each logic module using at least one dedicated full-duplex communication line of LVDC type.

Figure 5:
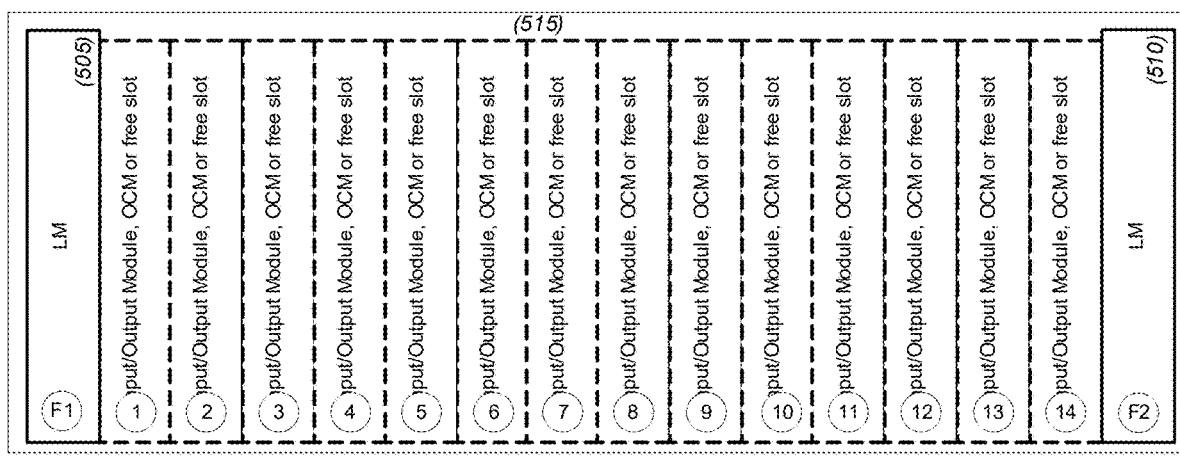
FIG. 5 shows a chassis configuration.

Chassis configuration is provided in FIG. 5.

Platform chassis consists two slots (F1 505 and F2 510) for logic modules and 14 slots 515 for modules of other type. Slots 1-14 515 can include input modules, output modules, and optic communication modules or do not contain any modules.

Figure 6:
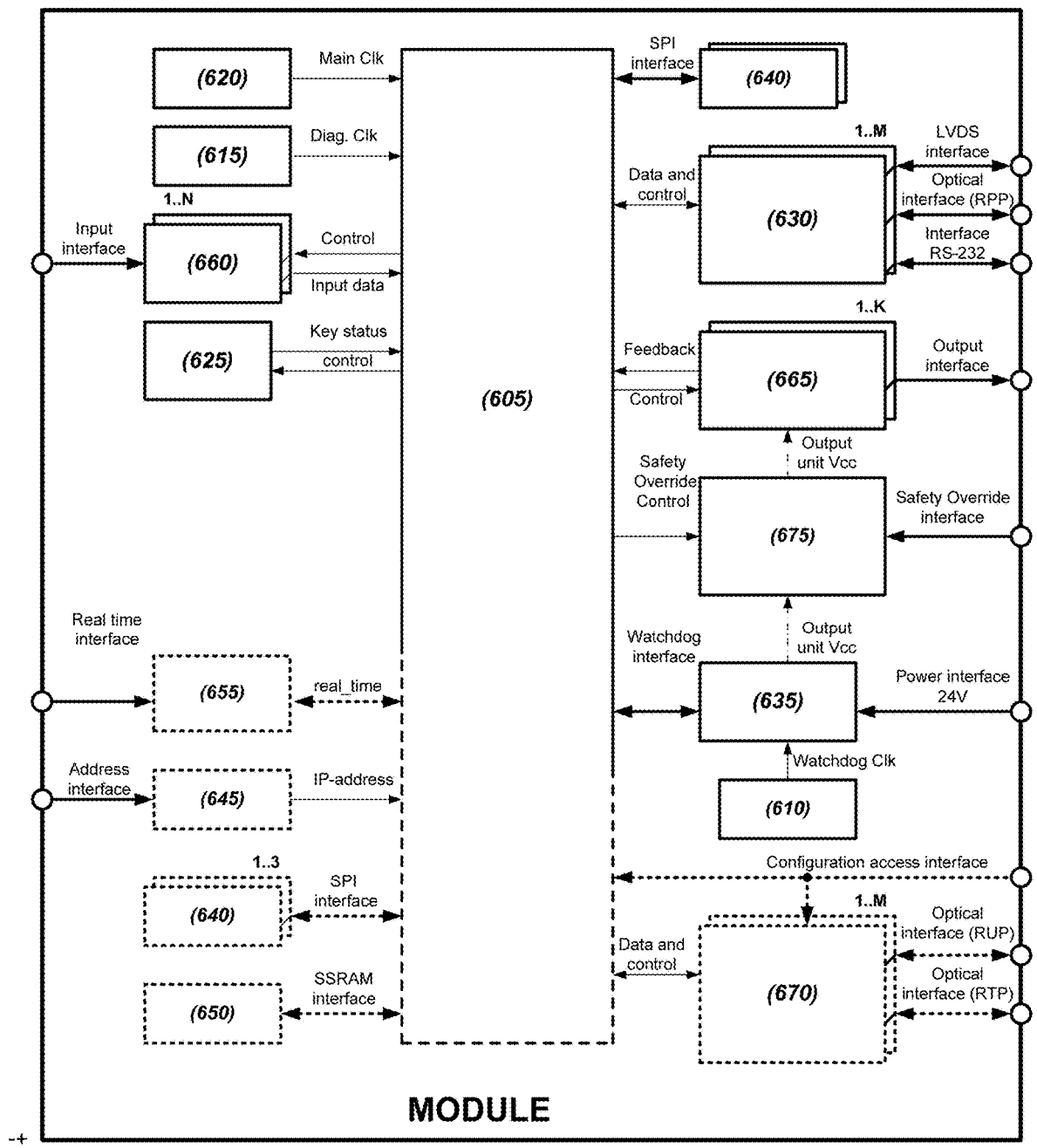
FIG. 6 illustrates a typical module architecture of platform module.

Standard architecture of platform module is provided in FIG. 6.

Each of plurality of self-diagnostic modules with the unified architecture contains FPGA unit 605 (Platform logic FPGA), CLK A unit 610—generation of watchdog timer clock cycles, CLK B unit 615—generation of diagnostic logic clock cycles, CLK C unit 620—generation of control logic clock cycles, indication unit 625 (IBU), communication unit 630 (LAN, OPTO, LVDS), Power Supply and Watchdog unit 635, EEPROM non-volatile memory unit 640. Herewith Watchdog Timer is based on the diverse technology—complex programmable logic device CPLD in regard to hardware of application logic and diagnostic logic.

Each logic module LM additionally includes Address unit 645, SSRAM operating memory unit 650, Real Time unit 655, input unit 660, output unit 665, external communication (RUP, RTR) unit 670, Safety Override unit 675. Each logic module LM can contain a few non-volatile EEPROM memory units 640 to save computing facilities.

Each Optic Communication Module additionally includes external communication unit 670.

Each input module additionally includes input unit 660.

Each output module additionally includes output module 665, Safety Override unit 675.

Platform, if necessary, can include other modules and devices to provide its functioning.

Units of Clock Generator (CLK a, B, C).

Units of clock generator CLK A, B, C are sources of frequency clock cycles for FPGA projects.

The functions:
CLK A unit—generation of Watchdog Timer clock cycles (WD Clk),
CLK B unit—diagnostic of FPGA unit processing (Diag Clk),
CLK C unit—main functions of FPGA unit—control and configuration of control logic (Main Clk).

Figure 7:
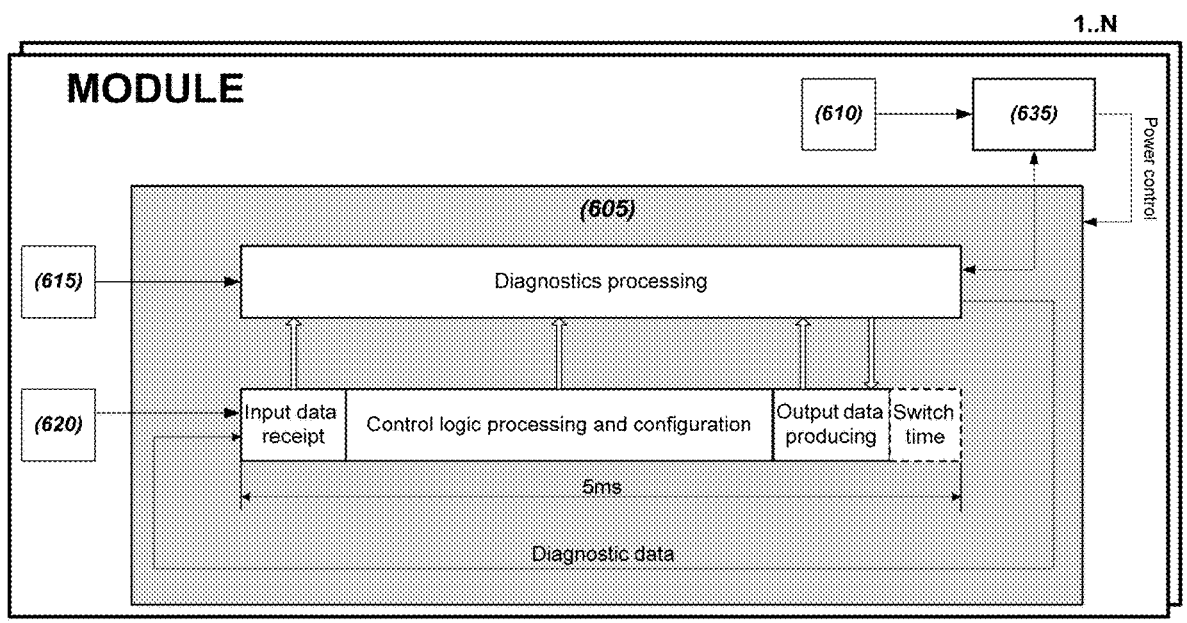
FIG. 7 shows data and signals exchange between different clock domains.

Safety functions:

FPGA and Watchdog Timer diagnostic, combination of CLK units provides mutual diagnostics because of data and signals exchange between different clock domains. Data and signals exchange between different clock domains are shown in FIG. 7.

Fpga Unit.

Functions:

provision of safety-critical functions: input data acquisition, performance of the main module functions (data processing, application logic design etc.) and diagnostics, output data generation, data exchange with other modules (both within chassis and outside it) using LVDS Interface, Fiber Optic (RPP) Interface and RS-232 Interface;

provision of non-safety functions (that do not influence the safety-critical functions): interaction with the external memory (safety critical in START mode), data transfer using Fiber Optic UDP-based (RUP) Interface and Fiber Optic Tuning (RUP) Interface to the external devices.

Safety Functions:

separation of control logic functions and diagnostic functions by usage of two separate clock domains (FIG. 7): CLK B is used for processing diagnostic, CLK C—for processing and configuration of control logic;

self-diagnostics of the performed functions is provided by the platform logic functions:

a) continuous Cyclic Redundancy Check CRC of FPGA configuration saved in configuration device and comparison with the previously calculated CRC sent from Service EEPROM, to check downloading of the corresponding configuration to the module configuration device (safety-critical only in START mode), b) continuous Cyclic Redundancy Check CRC for SSRAM configured by FPGA, and comparison with the previously calculated CRC received in the end of configuration (embedded function for FPGA), c) FPGA functioning diagnostics is provided by the Watchdog Timer, d) FPGA reads temperature values and final user is responsible for the corresponding action (notification or shutdown).

Indication Unit (IBU).

Functions:

provision of information indication for the user (information depends on the mode and module type) and option of transition to CONFIGURATION mode.

Safety functions:

the unit can influence the module functioning only during the first 10 or 20 seconds of START mode;

for switching module to CONFIGURATION mode it is necessary to press the buttons in the appropriate order in the established time period (not more than 20 seconds).

Input unit (analog-to-digital conversion ADC, discrete input unit DIU, neutron flux measurement NFM).

Functions:

provision of input data acquisition using interaction with I/O Interface.

Safety functions:

hardware includes HWU SD,

HWU SD is provided in several ways: HWU design and platform logic, provision of diagnostics of I/O interface integrity.

Outputs Unit (Discrete Output Unit DOU, Digital-to-Analog Conversion DAC).

Functions:

provision of output data generation using interaction with I/O Interface.

Safety functions:

hardware includes HWU SD,

HWU SD is provided by a few approaches: HWU design and platform logic, provision of I/O Interface integrity diagnostics, when de-energized safe state of the outputs is actuated.

Communication Units (Local Area Network LAN, OPTO, LVDS and RS-232).

Functions:

provision of data and implementation of data exchange inside and among the chassis, direct interaction with all communication interfaces, usage of different protocols (Radiy Proprietary Protocol—RPP, Radiy UDP based Protocol—RUP, Radiy RS-232 based Protocol—RS-232).

Safety functions:

unit diagnostics is performed by diagnostics of the data transferred through it, diagnostics of transferred data is performed by data exchange protocol and platform logic, Fiber Optic (RUP) Interface is de-energized if Setting switch is not in SETTING position and the platform is not in SETTING mode, all external communication channels are optically isolated, access to monitoring station is one direction.

Power Supply & Watchdog Timer Unit.

Functions:

current supply to all hardware units, current control and FPGA unit hardware self-diagnostics.

Safety functions:

diagnostics of the power supply voltage is performed by the controllers of Over-range and Voltage supervisor & Watchdog FPGA diagnostics is performed on the basis of data exchange between Voltage supervisor & Watchdog and FPGA using Watchdog Interface, When the errors of type I are detected the current supply to all module units is stopped except Power Supply and Watchdog unit.

Safety Override Unit.

Functions:

provision of the safe state for the modules by de-energizing the output units regardless the control signals for them from FPGA unit. Direct interaction with Safety Override Interface.

Safety functions:

three channels of module input signal are designed according to 2oo3 scheme to actuate safe state of the output units (set SOR signal (Safety Override unit), when the module is energized, safe state of the output units is actuated till the operator sets signal for cancelling safe state of the module output units (SOR restart); SOR signal must be high at that time, provides signal of SOR state for FPGA to check its performance/non-performance during SOR switches actuated.

Address Unit.

Functions:

provision of current supply to the jumpers located on the back board that provides an ability to identify a unique identifier of LM module within the whole safety system. Direct interaction with Address Interface. Unique identifier of LM module does not influence its safety functions. If an error occurs when reading such jumpers when actuated, non-conformity of the value of such read identifier and value saved in EEPROM will lead to boot failure and safe state of the platform.

Just after start of logic module LM it establishes own IP address on identifier basis. If its value differs from an expected value of Monitoring and Tuning System MATS or tuning station, connection with logic module LM does not happen: transfer to monitoring machine may not happen or setting will be not possible that is not safety-critical. However, safety-related checks will be performed to provide system accessibility.

Reliability functions:
separate source of unique LM identifier for each logic module LM,
CRC-4-ITU ($x^4+x+1$) for provision of data integrity verification of unique LM identifier,
data storage only in START mode, and comparison with the input data in other modes,
information about unit configuration is depicted on the indicator.

Non-Volatile EEPROM Memory Unit.
Functions:
storage of different data necessary for module functioning.
Safety functions:
recording/reading by frames,
check of data integrity,
check of frame numeration,
data identification.

Random Access Memory Unit (SSRAM).
Functions:
storage of data of application logic required for I&C System functioning.
Safety functions:
data integrity check.

Real Time Unit.
Functions:
real-time data acquisition.
Safety functions:
non-use of time signal of any safety critical function,
usage of special data format,
galvanic isolation.

Platform Functioning Principle.

Figure 2:
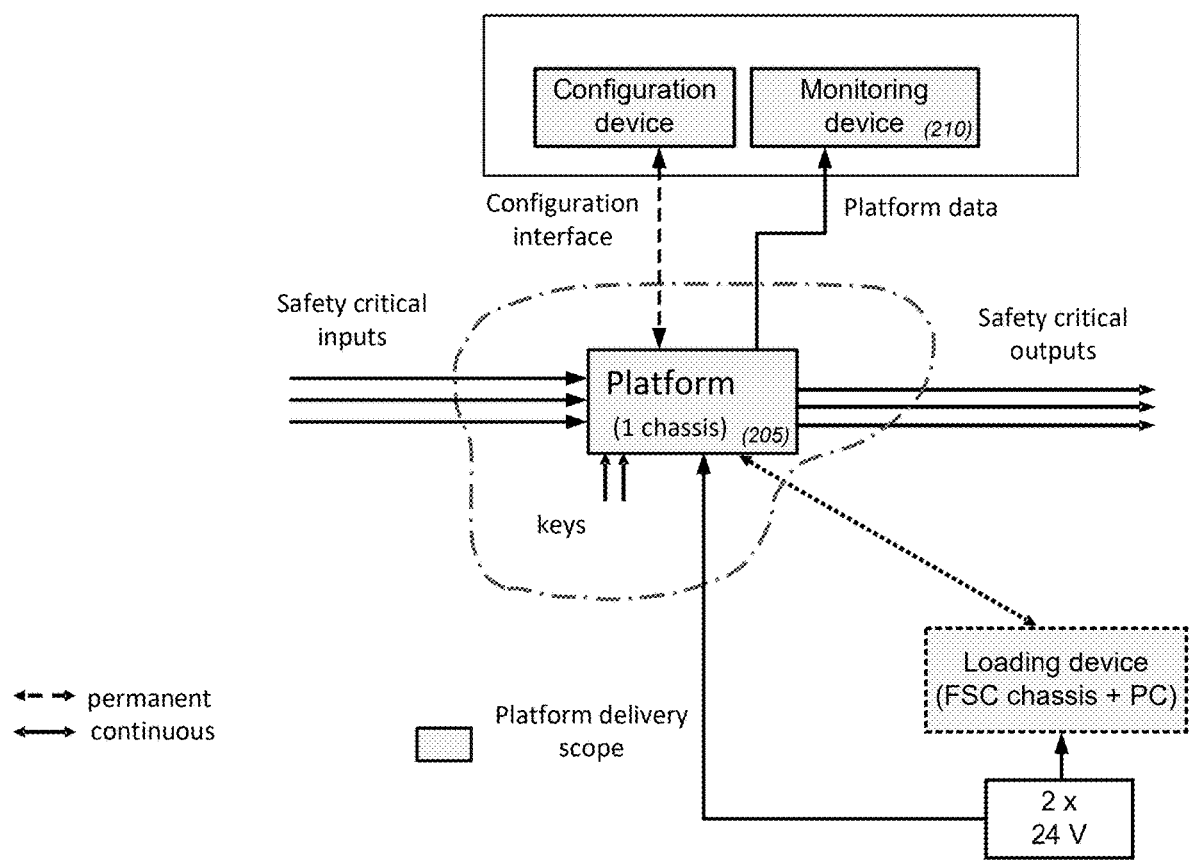
FIG. 2 illustrates a baseline configuration means design of one chassis.

Platform functioning principle with one chassis is shown in FIG. 2.

The platform 205 receives safety-critical input data, performs application logic and generates safety-critical output data. Downloading device (programmer) is used for downloading application logic. Observance of access right by setting device (engineering station) provides an option of signal parameters change within permitted limits, change of signal conditioning time delay elements settings, change of I/O module setting configuration (scale, signal level, modifications, damping time, delay time for clangor elimination etc). Monitoring device 210 provides to revise input/output data state at any moment, connection with monitoring device is one direction. The switches provide safe transition of the platform to SETTING mode for setting performance.

Figure 3:
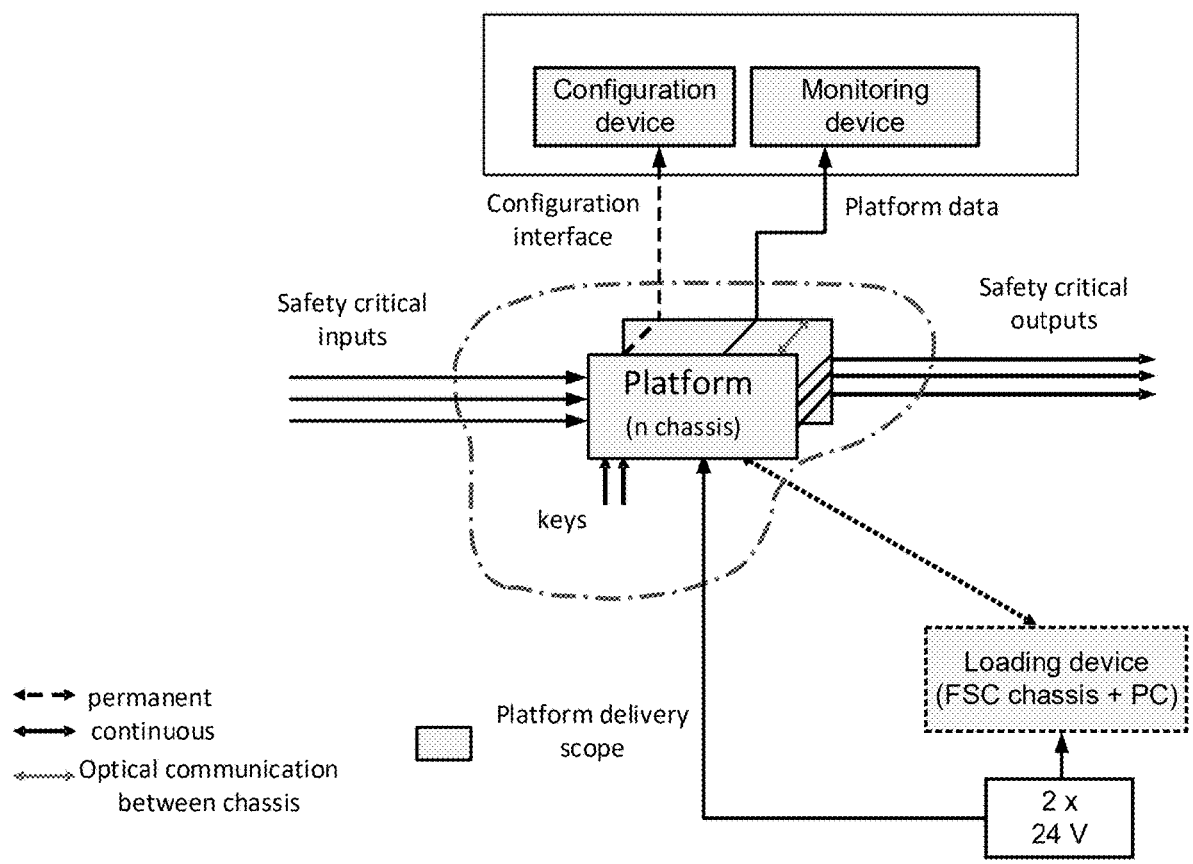
FIG. 3 shows a platform context diagram with a few chassis.

Platform functioning principle with several chassis is shown in FIG. 3.

The platform may consist of several chassis.

The safety critical input data is transferred to each platform chassis where application logic is performed and safety-critical output data is generated. On the basis of the safety-critical output data from each chassis the resulting safety-critical output data is generated. Data exchange between platform chassis is constantly performed via optic communication channels. To download application logic the downloading device (programmer) is used. Observance of access right by setting device (engineering station) provides an option of signal parameters change within permitted limits, change of signal conditioning time delay elements settings, change of I/O module setting configuration (scale, signal level, modifications, damping time, delay time for clangor elimination etc). Monitoring device provides for the revision of state of input/output data at any moment, connection with the monitoring device is one direction. The switches provide safe transition of the platform to SETTING mode for setting performance.

Platform Operation Modes.

Figure 8:
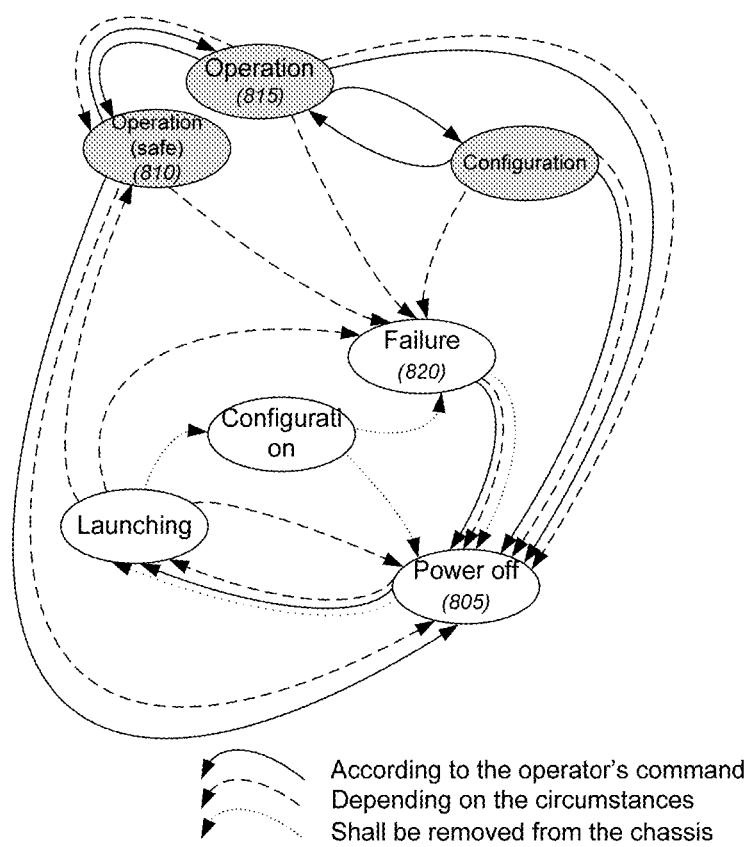
FIG. 8 shows possible platform modules operation modes and transition between them.

Possible platform modules operation modes and transition between them are shown in FIG. 8.

The platform modules operate in the following modes:

Start mode—power off "Power Off", after that switch to other modes are possible according to scheme in FIG. 8.

Power Off Mode 805.

This mode provides de-energizing of the platform module or the whole platform in the following cases:
human (or operator's) action,
loss of power source.

Start Mode.

In this mode FPGA receives configuration from EEPROM and performs configuration Cyclic Redundancy Check. After that FPGA actuates normal operation, including performance of application logic, self-diagnostics. If failure occurs (errors of type I) the module actuates Failure mode. If no failure, the module actuates Safety Operation or Operation mode (depending on the module type), however, the operator can initiate transition to Configuration mode.

Safety Operation Mode 810.

In this mode the application logic is performed, but the outputs are re-identified by the defined values (SOR unit) and located in safe state. The operator switches to Operation mode or Setting mode. Automatic switch to Operation or Setting modes is impossible. This mode is not provided for input modules as long as they have no outputs. In this mode self-diagnostics testing is performed that is similar to Operation mode.

Operation Mode 815.

In this mode the application logic is performed, the signals are transferred to the outputs, the self-diagnostic testing is performed.

Setting Mode.

In this mode the parameters can be set by connection with the computer platform with the special software. This mode requires usage of the Setting switch, when command issue is locked allowing the end user to test the setting changes in safety mode.

Failure Mode 820.

In this mode all outputs are enforced to safe state. This transition happens in case of failure detected. The only way to exit this mode is to de-energize the platform.

Configuration Mode.

This mode has two functions: configuration and calibration.

1. Configuration:
    Application logic or platform configuration are changed using special device Download Station (DLS). All modules save authentication data in EEPROM including information about versions.

This information is sent to monitoring device MATS. To change or download this data, this mode and DLS are used.

2. Calibration:
Analog modules (AIM, AOM and AIFM) use this mode for hardware calibration. Calibration can be performed in operating chassis, however, the developer must ensure safety during calibration. Calibration can be also performed in DLS.

Instrumentation and Control System Operates as Follows.

The input data are received and processed in the platform modules configured in functionally oriented architecture of Instrumentation and Control System by setting the computing facilities using RPCT as application logic.

The input signals of the process parameters are received by the I&C System input modules (DIM, AIM, AIFM etc.) where they process the platform logic. Processing includes signals filtering, validity check using duplicated AD converter. The input signals from input modules using LVDC are transferred to the logic module where according to the settled configuration of the computing facilities they are used by application logic that is performed by the platform logic. The signals processed by the logic module using LVDS are transferred to output modules (DOM, AOM) where they are processed by the platform logic. Therewith, processing of the main and diagnostic data is performed in different clock domains (FIG. 7). Main data (generation of control logic clock cycles) is processed in unit 8 of clock generator CLK C. Diagnostic data (generation of diagnostic logic clock cycles) is processed in unit 7 of clock generator CLK B. In a separate clock domain—unit 6 of clock generator CLK A Watchdog Timer operates that is designed on the diverse technology. The output modules generate I&C System output signals. From the output modules the output signals are transferred to the user of the output signals. In the cases configured by the user the Discrete Output Module has an option of safety override.

Diagnostic data is transferred to logic module and processed by the application logic, if needed (configured by the user).

To scale the system (develop bigger system with more inputs/outputs and performed functions) the optic communication modules OCM are used.

The invention claimed is:

1. A method of creation of a computing facility for safety Instrumentation and Control (I&C) Systems, comprising of platform modules,
wherein a platform logic and application logic are formed, wherein RadIC Platform Configuration Toolset (RPCT) toolset is designed, wherein functional block library is developed, therein application logic is described as a set of calls of function blocks from the library with step-by-step control by comparing results from duplicate function blocks and using the selection rule<<2oo2>>,
that is distinguished by the fact that
two levels of function execution are formed: platform—for performing safety and diagnostic functions independently of the user and which is a part of field-programmable gate array (FPGA) configuration; and user—user-defined operation logic that uses platform logic and all safety functions included in it to perform its functions and which is not part of FPGA platform configuration,
RPCT toolset which is used for platform configuration, design and uploading of a logic for various applications, herewith the application logic is described in graphical form, is compiled, converted into a set of commands to call functions from the Logic Module library and is loaded into the Logic Module to perform application functions, while automated-based verification of application logic is provided using RPCT,
where Functions Library is designed, which is a part of a platform logic and is called for execution in accordance with the command set generated after compilation in the development environment and loaded into the Logic Module so that a computing facility is described and implemented in FPGA of each platform modules as embedded platform logic and as finite-state machine with strictly determined execution time to execute commands for calling application logic functions, where the embedded platform logic using FPGA provides continuous control of all platform and user-level functions, including using a separate programmable logic chip (CPLD, Complex Programmable Logic Device) on a diverse technology in relation to the main FPGA, where a library of functions is developed with redundancy.

2. The method as set forth in claim 1, that is distinguished by the fact that step-by-step control is performed by comparing results from duplicated sets of functions whose hardware independence is ensured by FPGA manufacturer software and further verified.

3. The method as set forth in claim 1, that is distinguished by the fact that platform logic is developed without hardware-dependent parts of the code, allowing adaptation and transfer to the new devices regardless the hardware model.

4. The method as set forth in claim 1, that is distinguished by the fact that in the configuration with two logic modules, their cross-checking provided, mutual diagnostics of each other's state by logic modules is performed, and guaranteed switching between Logic Modules without interruption of the safety functions performing.

* * * * *